(12) United States Patent
Takeshita

(10) Patent No.: US 7,365,778 B2
(45) Date of Patent: Apr. 29, 2008

(54) ELECTRONIC CAMERA AND WHITE BALANCE CORRECTION CIRCUIT

(75) Inventor: Tetsuya Takeshita, Yokohama (JP)

(73) Assignee: Nikon Corporation, Tokyo (JP)

( * ) Notice: Subject to any disclaimer, the term of this patent is extended or adjusted under 35 U.S.C. 154(b) by 674 days.

(21) Appl. No.: 10/646,832

(22) Filed: Aug. 25, 2003

(65) Prior Publication Data

US 2004/0041941 A1    Mar. 4, 2004

(30) Foreign Application Priority Data

Aug. 29, 2002    (JP)    ............................. 2002-250104

(51) Int. Cl.
*H04N 9/73*    (2006.01)
(52) U.S. Cl. .............................. 348/223.1; 348/222.1; 348/224.1; 348/371
(58) Field of Classification Search .. 348/222.1–229.1, 348/370–371, 207.99, 65–76
See application file for complete search history.

(56) References Cited

U.S. PATENT DOCUMENTS

| | | | | |
|---|---|---|---|---|
| 5,099,313 A | * | 3/1992 | Suemoto et al. | 348/226.1 |
| 5,539,456 A | * | 7/1996 | Ishii | 348/224.1 |
| 5,568,194 A | * | 10/1996 | Abe | 348/223.1 |
| 5,617,141 A | * | 4/1997 | Nishimura et al. | 348/366 |
| 5,808,681 A | * | 9/1998 | Kitajima | 348/371 |
| 6,163,342 A | * | 12/2000 | Suzuki | 348/364 |
| 6,529,235 B1 | * | 3/2003 | Tseng | 348/223.1 |
| 6,700,619 B1 | * | 3/2004 | Hamamura | 348/370 |
| 6,906,744 B1 | * | 6/2005 | Hoshuyama et al. | 348/223.1 |
| 6,952,225 B1 | * | 10/2005 | Hyodo et al. | 348/223.1 |
| 6,963,362 B1 | * | 11/2005 | Nakayama | 348/224.1 |
| 6,989,859 B2 | * | 1/2006 | Parulski | 348/223.1 |
| 7,006,135 B2 | * | 2/2006 | Ishimaru et al. | 348/223.1 |
| 7,098,944 B1 | * | 8/2006 | Shiraiwa et al. | 348/222.1 |
| 7,106,378 B2 | * | 9/2006 | Kawakami | 348/371 |

\* cited by examiner

*Primary Examiner*—David Ometz
*Assistant Examiner*—Pritham Prabhakher
(74) *Attorney, Agent, or Firm*—Oliff & Berridge, PLC

(57) ABSTRACT

The invention relates to an electronic camera and a white balance correction circuit both capable of setting white balance correction values properly at stroboscope imaging by relatively simple processing. The electronic camera has a stroboscope unit or a connection terminal to a stroboscope unit; an imaging unit for capturing an image of a subject; a calculating unit for calculating, from the image captured with double illumination of both field light and strobe light emitted by the stroboscope unit, the color temperature of the double illumination; and a reflection unit for allowing the calculated color temperature to be reflected in white balance correction values to be applied to the image. When the calculated color temperature is in a predetermined range, the reflection unit decreases the degree of the reflection.

16 Claims, 8 Drawing Sheets

| LOOK-UP TABLE | | | | | | | |
|---|---|---|---|---|---|---|---|
| COLOR TEMPERATURE FOR INPUT | ... | 3900 | ... | 5200 | ... | 6500 | ... |
| NON-STROBOSCOPE IMAGING / NON-FLUORESCENT LIGHT | ... | (Kr, Kb) | ... | (Kr, Kb) | ... | (Kr, Kb) | ... |
| NON-STROBOSCOPE IMAGING / FLUORESCENT LIGHT | ... | (Kr, Kb) | ... | (Kr, Kb) | ... | (Kr, Kb) | ... |
| STROBOSCOPE IMAGING | — | — | — | (Kr, Kb) | ... | (Kr, Kb) | — |

Fig. 7
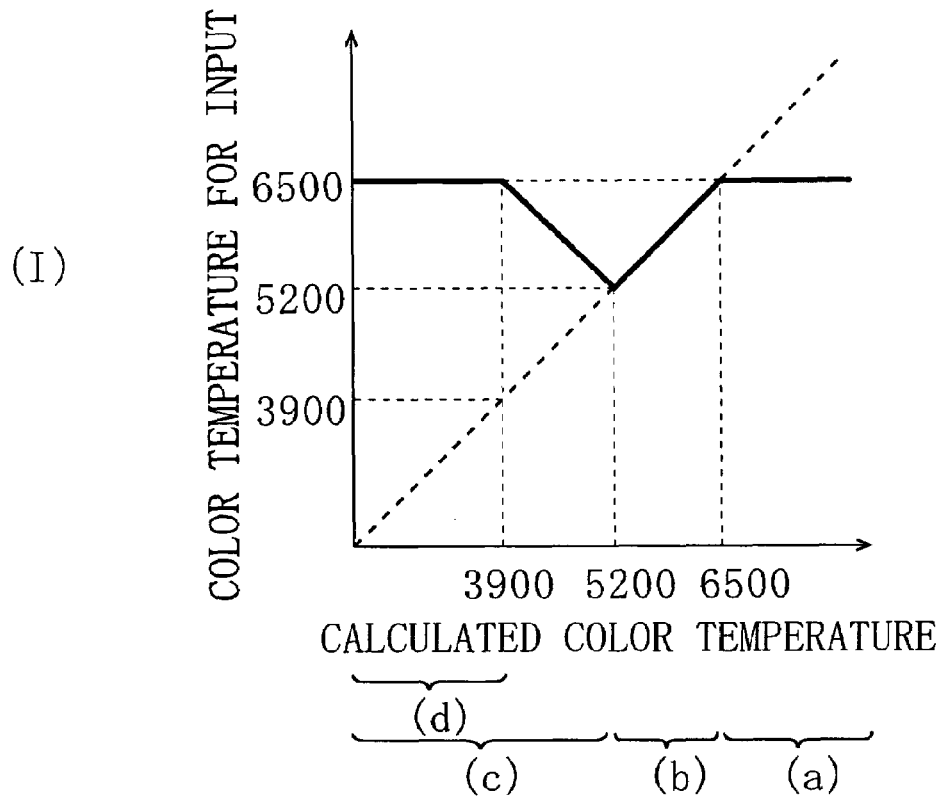
(I)
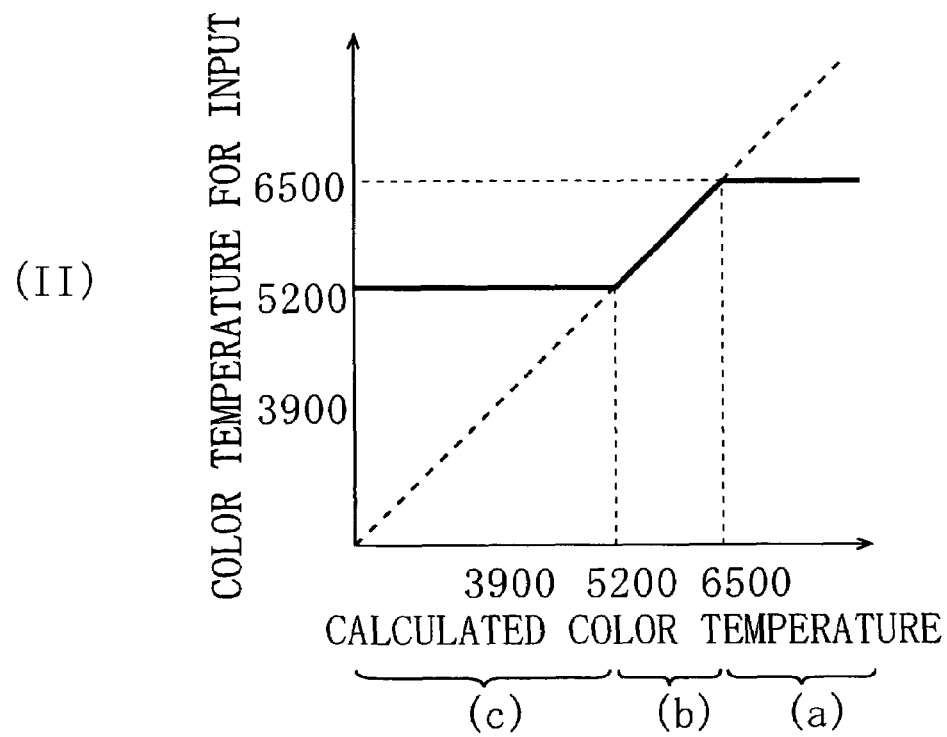
(II)

ELECTRONIC CAMERA AND WHITE BALANCE CORRECTION CIRCUIT

CROSS REFERENCE TO RELATED APPLICATION

This application is based upon and claims the benefit of priority from the prior Japanese Patent Application No. 2002-250104, filed on Aug. 29, 2002, the entire contents of which are incorporated herein by reference.

BACKGROUND OF THE INVENTION

1. Field of the Invention

The present invention relates to an electronic camera capable of performing stroboscope imaging and a white balance correction circuit applied to the electronic camera.

2. Description of the Related Art

In general, white balance correction values of an electronic camera are determined according to the color temperature of illumination that illuminates a subject and to the type of the illumination. The color temperature and type of the illumination can be obtained, for example, from an image of the subject and from an output of a colorimeter. The white balance correction values are determined by not only the color temperature of the illumination but also the type of the illumination because two different types of illumination (e.g., illumination of fluorescent light and that of natural light) having the same color temperature may have significantly different color renderings.

On the other hand, at stroboscope imaging a subject is illuminated with double illumination of strobe light and field light (light other than the strobe light). Therefore, it is preferable that the white balance correction values should be decided according to the type and color temperature of the field light as well as the type and color temperature of the strobe light. However, the type and color temperature of the strobe light is actually unique to the stroboscope device. At present the following methods (1) through (4) are proposed for determining the white balance correction values at stroboscope imaging.

(1) A method in which the white balance correction values are so determined as to suppress the color of the single illumination of the strobe light on the assumption that strobe light provides a much stronger influence on the subject than any field light.

(2) A method in which the type and color temperature of the field light are obtained from a pre-imaging prior to strobe light emission or an output of a colorimeter to average such values that suppress the color of the single illumination of the field light and such values that suppress that of the strobe light, thereby determining the average values as the white balance correction values.

(3) A method in which, further to the method (2), the intensity of the field light is measured to estimate an amount of the strobe light emission (i.e., the degree of influence which the strobe light has on the subject), and the foregoing averaging is weighted in accordance with the degree of influence.

(4) A method in which the type and color temperature of the field light are determined from a pre-imaging prior to a strobe light emission or from an output of a colorimeter, and then a subject distance is measured to estimate how much amount of the strobe light reaches the subject, thereby selecting either values that suppress the color of the single illumination of the field light or values that suppress that of the strobe light in accordance with the estimated amount (and further, the measurement of the subject distance, the estimation of the reaching light amount, and the value selection are performed for every area of the field.)

According to the method (1), however, the white balance correction is made by use of the same white balance correction values so that a certain stroboscopic image will be extremely inappropriately reproduced. For example, in a case where strobe light does not sufficiently reach the background of a subject because of a long distance, and besides the color temperature of the illumination to the background is low, an image captured in this condition may have unnaturally reddish background.

According to the methods (2), (3) and (4), they may be adaptable to a variety of stroboscopic images but reproduced images by these methods cannot gain users' satisfaction in spite of the fact that they are complex processing.

SUMMARY OF THE INVENTION

Then, it is an object of the present invention to provide an electronic camera and a white balance correction circuit that use relatively simple processing to properly set white balance correction values at stroboscope imaging (specifically, to set the values more appropriately than by the method (1), by simpler processing than by the foregoing methods (2), (3) and (4)).

The electronic camera of the present invention has a stroboscope unit or a connection terminal to a stroboscope unit. The electronic camera includes: an imaging unit for capturing an image of a subject; a calculating unit for calculating the color temperature of double illumination according to the image captured with double illumination of field light and strobe light emitted by the stroboscope unit; and a reflection unit for allowing the calculated color temperature to be reflected in a white balance correction value to be applied to the image. When the calculated color temperature is in a predetermined range, the reflection unit decreases the degree of the reflection. Thus, it is possible to set the white balance correction values appropriately at stroboscope imaging by use of relatively simple processing.

Preferably, the reflection unit allows the white balance correction value to be closer to such a value that suppresses the color of the single illumination of the strobe light when the calculated color temperature is higher than the color temperature of the single illumination. Also preferably, the reflection unit allows the white balance correction value to coincide with such a value that suppresses the color of the single illumination of the strobe light when the calculated color temperature is higher than the color temperature of the single illumination. In this way, a stroboscopic image with distant a background of a low color temperature is reproducible without unnatural reddishness.

Also preferably, the reflection unit allows the white balance correction value to be closer to such a value that suppresses the color of the single illumination of the strobe light when the calculated color temperature is lower than the color temperature of illumination equivalent to daytime light. This enables the user to reproduce an image with colors approximate to colors as he/she intends to realize when wishing to obtain a reddish image at stroboscopic imaging.

Also preferably, the reflection unit allows the white balance correction value to be much closer to the foregoing value when the calculated color temperature is lower than the color temperature of illumination equivalent to daytime light and is also lower than the color temperature of illumination equivalent to sunset light. Also, the reflection unit allows the white balance correction value to coincide with the foregoing value when the calculated color temperature is lower than the color temperature of illumination equivalent to daytime light and is also lower than the color temperature of illumination equivalent to sunset light. Accordingly, the user is reproducible of an image with colors more approximate to colors as he/she intends to realize when wishing to obtain a reddish image at stroboscopic imaging.

Also preferably, the reflection unit allows the white balance correction value to be closer to such a value that suppresses the color of the illumination equivalent to daytime light when the calculated color temperature is lower than the color temperature of illumination equivalent thereto. In this way, the blueness of a stroboscopic image the user captures under illumination of fluorescent light can be suppressed to an appropriate degree.

More preferably, the electronic camera further includes a unit for identifying the type of the field light, in which the reflection unit changes, depending on the identified type, a relationship between a range of the calculated color temperature and the degree of the reflection. This allows the white balance correction value to be set appropriately at stroboscope imaging regardless of the type of the field light.

The white balance correction circuit of the present invention includes: a calculating unit for calculating, according to an image captured by the electronic camera with double illumination of strobe light and field light, the color temperature of the double illumination; and a reflection unit for allowing the calculated color temperature to be reflected in the white balance correction value to be applied to the image. When the calculated color temperature is in a predetermined range, the reflection unit decreases the degree of the reflection.

Preferably, the reflection unit allows the white balance correction value to be closer to such a value that suppresses the color of the single illumination of the strobe light when the calculated color temperature is higher than the color temperature of the single illumination thereof. Also preferably, the reflection unit allows the white balance correction value to coincide with such a value that suppresses the color of the single illumination of the strobe light when the calculated color temperature is higher than the color temperature of the single illumination thereof. In this way, a stroboscopic image with a distant background of a low color temperature is reproducible without unnatural reddishness.

Also preferably, the reflection unit allows the white balance correction value to be closer to such a value that suppresses the color of the single illumination of the strobe light when the calculated color temperature is lower than the color temperature of illumination equivalent to daytime light. This enables the user to reproduce an image with colors approximate to colors as he/she intends to realize when wishing to obtain a reddish image at stroboscopic imaging.

Also preferably, the reflection unit allows the white balance correction value to be much closer to the foregoing value when the calculated color temperature is lower than the color temperature of illumination equivalent to daytime light and is also lower than the color temperature of illumination equivalent to sunset light. More preferably, the reflection unit allows the white balance correction value to coincide with the foregoing value when the calculated color temperature is lower than the color temperature of illumination equivalent to daytime light and is also lower than the color temperature of illumination equivalent to sunset light. This enables the user to reproduce an image with colors more approximate to colors as he/she intends to realize when wishing to obtain a reddish image at stroboscopic imaging.

Also preferably, the reflection unit allows the white balance correction value to be closer to such a value that suppresses the color of illumination equivalent to daytime light when the calculated color temperature is lower than the color temperature of the illumination equivalent to daytime light. In this way, the blueness of a stroboscopic image the user captures under illumination of fluorescent light can be suppressed to an appropriate degree.

Also preferably, the white balance correction circuit of the present invention further includes a unit for identifying the type of the field light, and the reflection unit changes, depending on the identified type, a relationship between a range of the calculated color temperature and the degree of the reflection. This enables the white balance correction value to be appropriately set at stroboscopic imaging regardless of the type of the field light.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 7 is a diagram showing a method for referring to the look-up table for stroboscope imagings ("calculated color temperature versus color temperature for input" curves) implemented by a gain determination part 15c-3'.

DESCRIPTION OF THE PREFERRED EMBODIMENTS

Embodiments of the present invention will be described below with reference to the drawings.

First Embodiment

A first embodiment of the present invention will now be described with reference to FIGS. 1, 2, 3, 4 and 5. In the present embodiment, a camera system, to which an electronic camera of the invention is applied, will be described below. This electronic camera includes a white balance correction circuit of the invention.

Figure 1:
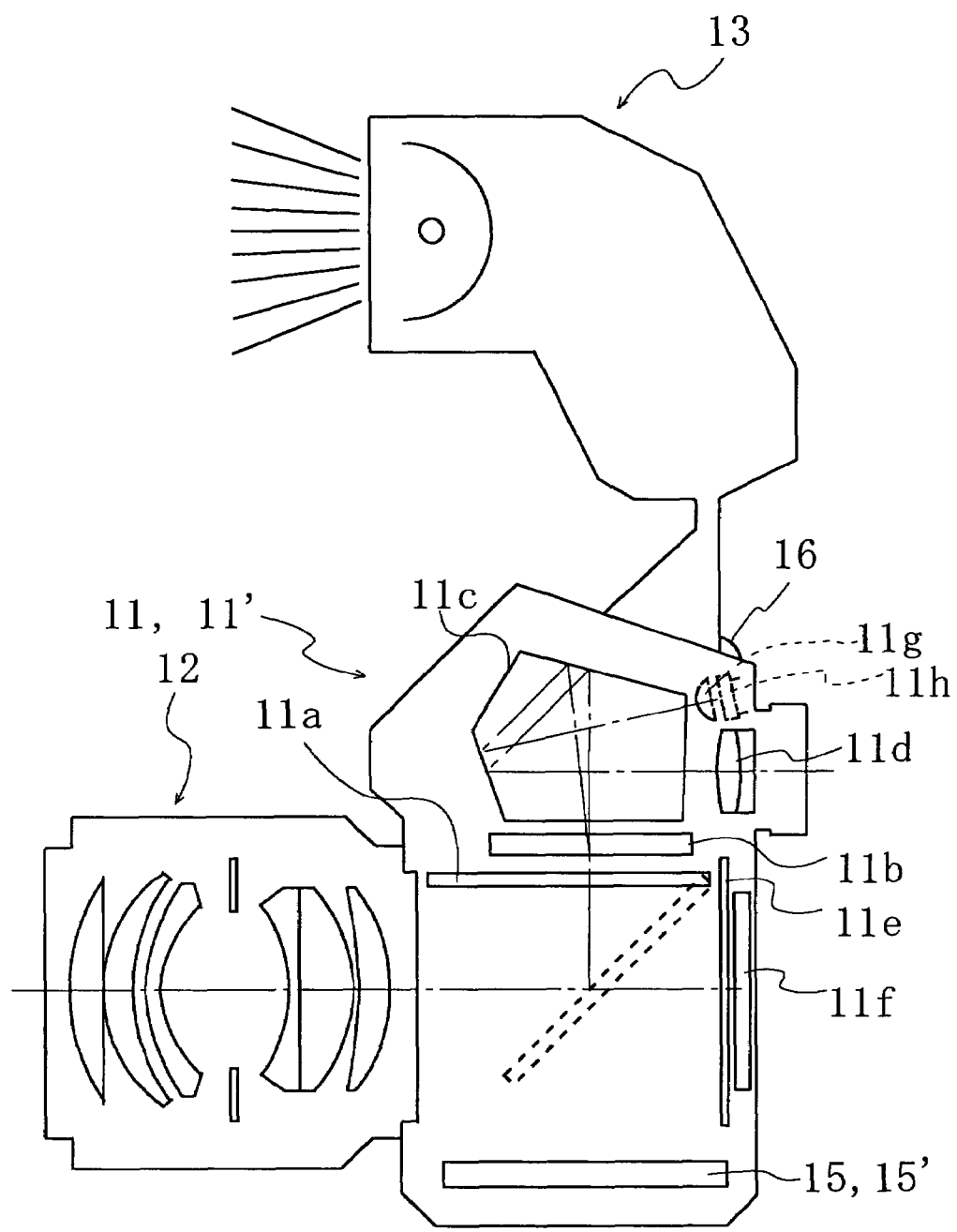
FIG. 1 is a schematic diagram of the structure of a camera system according to first and second embodiments of the present invention.

FIG. 1 is a schematic diagram showing the structure of the camera system of the present embodiment. The camera system includes an electronic camera body 11, a lens 12, and a stroboscope device 13. The lens 12 and stroboscope device 13 may be detachable from the electronic camera body 11. The electronic camera body 11 has operation buttons 16 such as a release button provided thereon with which the operator can change the mode of the electronic camera body 11 between non-stroboscope mode and stroboscope mode or give other imaging instructions to the electronic camera body 11 at his desired timings.

As illustrated in FIG. 1, the electronic camera body 11 may be a single-lens reflex camera which has a shutter 11e, a CCD imaging sensor 11f, a mirror 11a, a screen 11b, a pentaprism 11c, an eyepiece 11d, and so on. Inside the electronic camera body 11 illustrated with dotted lines are a colorimeter 11h and a condensing lens 11g that condenses an incident light flux onto the colorimeter 11h, both of which will be used in a second embodiment described later. The colorimeter 11h and condensing lens 11g are not used in the first embodiment, and hence not essential thereto.

At no imaging, the mirror 11a is in a "mirror-down state" as illustrated with dotted lines, and the light flux from a subject field, which is incident from the lens 12, is guided via the mirror 11a, screen 11b, pentaprism 11c and eyepiece 11d to the operator's eye. In this way the operator can visually identify the subject field, and also the colorimeter 11h can perform a color measurement of the subject field. At imaging, the mirror 11a in the electronic camera body 11 is in a "mirror-up state" as illustrated with solid lines, and the shutter 11e is driven. The CCD imaging sensor 11f is exposed to the light flux from the subject field. In this state, if the CCD imaging sensor 11f is driven, an image of the subject field is captured.

The stroboscope device 13 is electrically connected to the electronic camera body 11 via a contact (not shown). The stroboscope device 13 is driven in accordance with an instruction represented by an electric signal from the electronic camera body 11. During the imaging, especially when the electronic camera body 11 is in the stroboscope mode, the electronic camera body 11 instructs the stroboscope device 13 to emit strobe light for illuminating the subject field at the timing of the exposure stated above. It should be noted that if the amount of the strobe light emission of the stroboscope device 13 is variable, the electronic camera body 11 also gives information about such emission amount to the stroboscope device 13.

Figure 2:
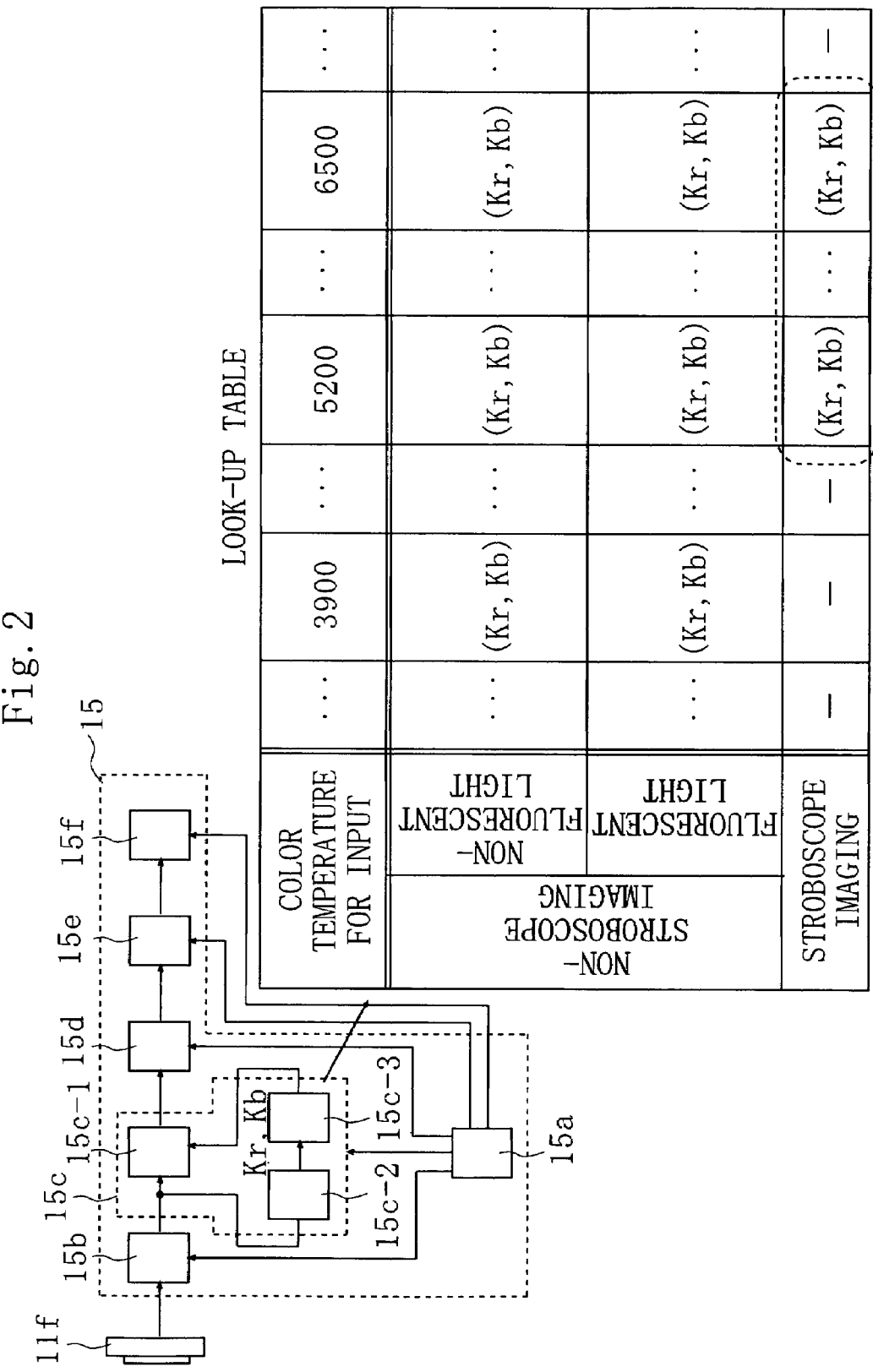
FIG. 2 is a block diagram of a circuit section 15 in an electronic camera body 11.

FIG. 2 is a block diagram of a circuit section 15 provided in the electronic camera body 11.

A CPU 15a provided in the circuit section 15 realizes the foregoing operations of the electronic camera body 11 by driving and controlling the components (i.e., the CCD imaging sensor 11f, shutter 11e, mirror 11a and so on). The CPU 15a operates in accordance with the operator's operations to the operation buttons.

The circuit section 15 includes, in addition to the CPU 15a, a signal processing circuit 15b, a white balance correction circuit 15c, a color transformation circuit 15d, a gray-scale transformation circuit 15e, an image memory 15f and so on. The signal processing circuit 15b, white balance correction circuit 15c, color transformation circuit 15d, gray-scale transformation circuit 15e and image memory 15f are also controlled by the CPU 15a.

A signal representative of an image captured by the CCD imaging sensor 11f is inputted to the circuit section 15. Then, this signal is subjected to predetermined signal processing in the signal processing circuit 15b, a white balance processing in the white balance correction circuit 15c, a color transformation processing in the color transformation circuit 15d, and to a gray-scale transformation processing in the gray-scale transformation circuit 15e. After subjected to these processing, the signal is stored in the image memory 15f.

The white balance correction circuit 15c includes, for example, a correction part 15c-1, a calculation part 15c-2 and a gain determination part 15c-3. The correction part 15c-1 multiplies the R and B components (R, B) of the signal (R, G, B) outputted from the signal processing circuit 15b by white balance gains (Kr, Kb), thereby performing the white balance processing on the signal. The white balance gains (Kr, Kb) are determined for each imaging (i.e., each image) by the calculation part 15c-2 and gain determination part 15c-3.

The calculation part 15c-2 refers to signals of a single image outputted from the signal processing circuit 15b to calculate the color temperature of illumination to the subject field according to the signal by use of a known technique. The gain determination part 15c-3 determines optimum white balance gains (Kr, Kb) for the image in accordance with the color temperature outputted by the calculation part 15c-2 (which will be referred to as "calculated color temperature" hereinafter.) The gain determination part 15c-3 is equipped with, for example, a look-up table for simplifying the determination processing. (See a table in the lower right part of FIG. 2.)

The look-up table stores therein every color temperature and its corresponding white balance gains (Kr, Kb) for suppressing the colors of illuminations at every color temperature. It should be noted that in the present embodiment, when the look-up table is referred to, the color temperatures inputted to the look-up table are not necessarily the same as calculated color temperatures to be outputted by the calculation part 15c-2, and hence will be referred to as "color temperatures for input" hereinafter so that they may be distinguished from the calculated color temperatures.

At non-stroboscope imaging, the subject field is illuminated with single illumination of the field light, and hence the calculated color temperature outputted by the calculation part 15c-2 is the color temperature of the single illumination of the field light. On the other hand, at stroboscope imaging, the subject field is illuminated with double illumination of the field light and the strobe light, and hence the calculated color temperature is the color temperature of the double illumination of the field light and the strobe light. Therefore, even if a calculated color temperature during a non-stroboscope imaging is equal to a calculated color temperature during a stroboscope imaging, the optimum white balance gains (Kr, Kb) corresponding to these calculated color temperatures are different.

Accordingly, two sorts of look-up tables are prepared here: a look-up table for non-stroboscope imagings and a look-up table for stroboscope imagings. The look-up table for non-stroboscope imagings stores such white balance gains (Kr, Kb) that suppress the colors of the single illumination of the filed light at each color temperature. These white balance gains are obtained beforehand by actual measurements or the like.

Note that in this look-up table for non-stroboscope imagings, white balance gains (Kr, Kb) corresponding to lower color temperatures include higher Kb (i.e., the higher white balance gains by which the B components are to be multiplied), while white balance gains (Kr, Kb) corresponding to higher color temperatures include higher Kr (i.e., the higher white balance gains by which the R components are to be multiplied). At non-stroboscope imaging, the subject field is illuminated with the field light, and hence the type of the field light can be determined from the aforementioned signals of a single image (for example, whether the field light is a fluorescent light or not).

The fluorescent light has a lower color rendering than other types of field lights (non-fluorescent lights). Therefore, when the field light is a fluorescent light, higher white balance gains (Kr, Kb) are required even if the calculated color temperature of illumination of the fluorescent light is the same as that of a non-fluorescent light. Therefore, at a non-stroboscope imaging, the calculation part 15c-2 calculates the color temperature according to an image signal, and also determines the type of the field light according to the same image signal (whether the field light is a fluorescent light or not).

Accordingly, two sorts of look-up tables are prepared for non-stroboscope imagings: a look-up table for fluorescent lights and a look-up table for non-fluorescent lights. These two look-up tables for non-stroboscope imagings are selectively used in accordance with the determined type of field light. (See the table in the lower right part of FIG. 2.)

On the other hand, the look-up table for stroboscope imagings stores therein such white balance gains (Kr, Kb) that suppress the colors of the single illumination of the strobe light at each color temperature. These white balance gains are obtained beforehand by actual measurements or the like. Also, in this look-up table for stroboscope imagings, white balance gains (Kr, Kb) corresponding to lower color temperatures include higher Kb (i.e., the higher white balance gains by which the B components are to be multiplied), while white balance gains (Kr, Kb) corresponding to higher color temperatures include higher Kr (i.e., the higher white balance gains by which the R components are to be multiplied).

However, since this look-up table for stroboscope imagings stores such white balance gains (Kr, Kb) that suppress the colors of the single illumination of the strobe light, it is suitable only for specific stroboscopic images (specifically, stroboscopic images shot with illumination having the color rendering of field light the same as that of strobe light). Because of this, at stroboscope imaging the gain determination part 15c-3 of the present embodiment implements an inventive method for referring to the look-up table for stroboscope imagings (calculated color temperature versus color temperature for input curve). The gain determination part 15c-3 recognizes, from a signal from the CPU 15a, whether imaging is stroboscopic or non-stroboscopic (the CPU 15a recognizes, from the operation on the operation buttons 16, whether the electronic camera body 11 is in the stroboscope imaging mode or the non-stroboscope imaging mode).

Figure 3:
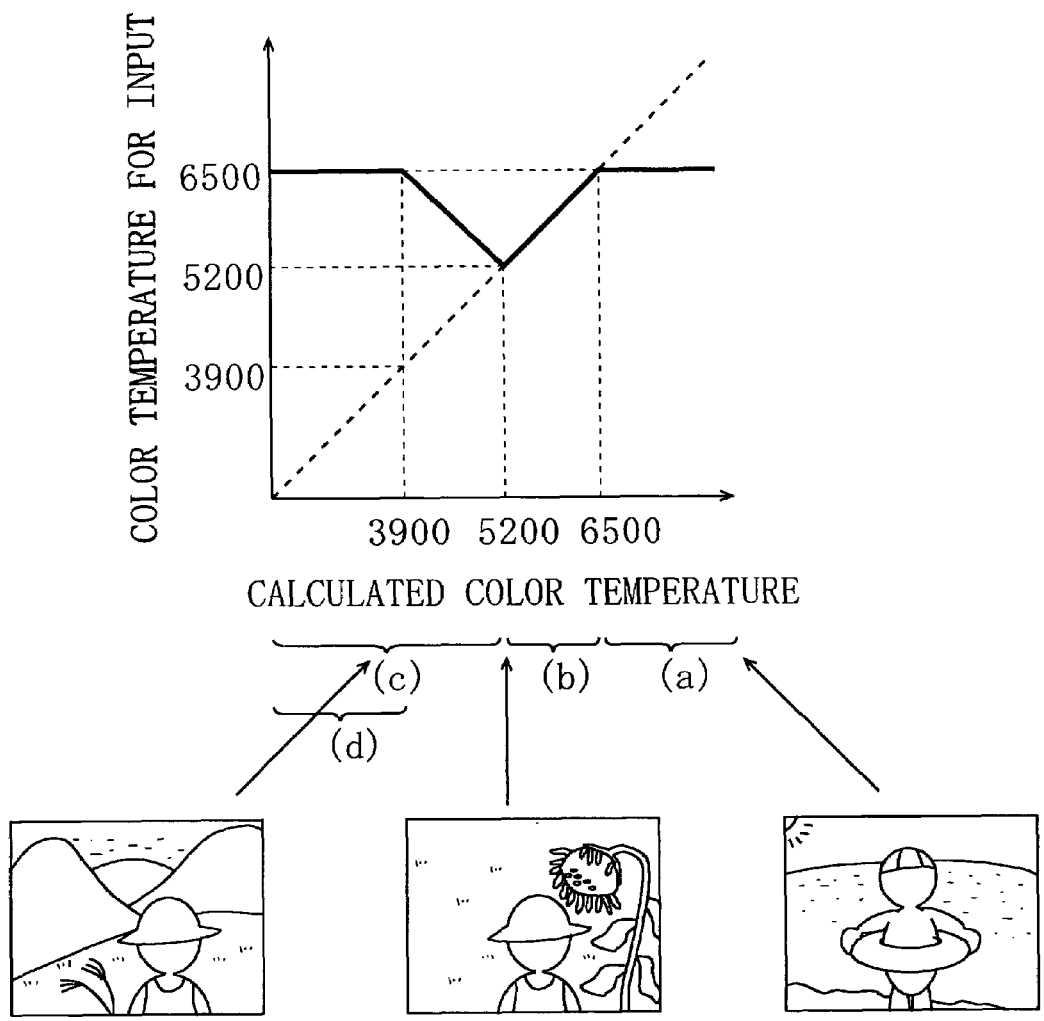
FIG. 3 is a diagram showing a method for referring to a look-up table for stroboscope imagings (a "calculated color temperature versus color temperature for input" curve) implemented by a gain determination part 15c-3.

FIG. 3 shows the inventive method for referring to the look-up table for stroboscope imagings (the "calculated color temperature versus color temperature for input" curve) implemented by the gain determination part 15c-3. In FIG. 3, the horizontal axis represents the calculated color temperature, while the vertical axis represents the color temperature for input. The following description will be made on a case where the color temperature of the single illumination of strobe light is 6500 K.

In many stroboscope imagings, the calculated color temperature is equal to or less than the color temperature of the single illumination of the strobe light (=6500 K) since the field light affects the strobe light. In the present embodiment, if the calculated color temperature is higher than the color temperature of the single illumination of the strobe light (=6500 K) (FIG. 3(a)), it is considered as erroneous and does not correctly indicate the color temperature of the double illumination of the field light and strobe light.

For example, with regard to a stroboscopic image having a background of a low color temperature in the distance such as having the sea in the background, the calculated color temperature is likely to be higher than the color temperature of the single illumination of the strobe light (=6500 K) due to an influence from blue color of the sea. Therefore, using this calculated color temperature of the stroboscopic image as a color temperature for input leads to setting white balance gains (Kr, Kb) at values that suppress blueness, resulting in reproducing image of a subject as a person with unnatural reddishness.

For the purpose of avoiding this from occurring, the gain determination part 15c-3 of the present embodiment brings the color temperature for input to be closer to the color temperature of the single illumination of the strobe light (=6500 K). For example, the color temperature for input is set to a value coinciding with the color temperature of the single illumination of the strobe light (=6500 K) regardless of the value of the calculated color temperature. That is, when the calculated color temperature is in the range (a) of FIG. 3, the "calculated color temperature versus color temperature for input" curve will not be a straight line of which the color temperature for input is equal to the calculated color temperature (the thick dotted line in the figure) but be a line of which the color temperature for input is 6500 K. In this way, it is possible to reproduce a good stroboscopic image having a distant background of a low color temperature without unnatural reddishness.

Meanwhile, when the calculated color temperature is equal to or less than the color temperature of the single illumination of the strobe light (=6500 K) and also equal to or higher than the color temperature of the illumination equivalent to daytime field light (illustratively, 5200 K) (FIG. 3(b)), it is considered that the calculated color temperature is reliable and hence is used as the color temperature for input. That is, when the calculated color temperature is in the range (b) of FIG. 3, the "calculated color temperature versus color temperature for input" curve will be the thick dotted line of which the color temperature for input coincides with the calculated color temperature.

In the present embodiment, when the calculated color temperature is lower than the color temperature of the illumination equivalent to the daytime field light (=5200 K) (FIG. 3(c)), the color temperature for input is set to a value closer to the color temperature of the single illumination of the strobe light (=6500 K). Especially when the calculated color temperature is equal to or less than the color temperature of the illumination equivalent to sunset light (illustratively, 3900 K) (FIG. 3(d)), the color temperature for input is set to a value much closer to the color temperature of the single illumination of the strobe light (=6500 K). For example, the color temperature for input is set to a value coinciding with the color temperature of the single illumination of the strobe light (=6500 K) regardless of the value of the calculated color temperature.

That is, when the calculated color temperature is in the range (d) of FIG. 3, the "calculated color temperature versus color temperature for input" curve is a line of which the color temperature for input is 6500 K. This is because stroboscopic images having a distant red color background such as sunset are often images which the operator intends to capture. In this case, the calculated color temperature is equal to or less than 3900 K. Using this calculated color temperature of the stroboscopic image as the color temperature for input leads to setting white balance gains (Kr, Kb) that suppress reddishness, resulting in reproducing an image with less reddishness which is a different color from that the operator intends to reproduce. Setting the color temperature for input to be equal to the color temperature of the single illumination of the strobe light (=6500 K) as in the present embodiment, however, allows the operator to obtain his intended image.

When the calculated color temperature is in the range (c) except for the range (d) of FIG. 3, the "calculated color temperature versus color temperature for input" curve is preferably a curve connecting separate straight lines, setting, for example, the color temperature for input to be equal to 10400 K minus the calculated color temperature. In such a case, the "calculated color temperature versus color temperature for input" curve exhibits a V-shape as a whole.

As described above, in case of the calculated color temperature being in a predetermined range (illustratively, a range of 6500 K or more and 5200 K or less), the electronic camera of the present embodiment can deal with various types of stroboscopic images by a simple processing of positively decreasing the degree of the reflection of the calculated color temperature in the white balance gains (Kr, Kb). That is, according to the present embodiment, during stroboscope imaging the white balance gains (Kr, Kb) can be appropriately set by use of the relatively simple processing.

Figure 4:
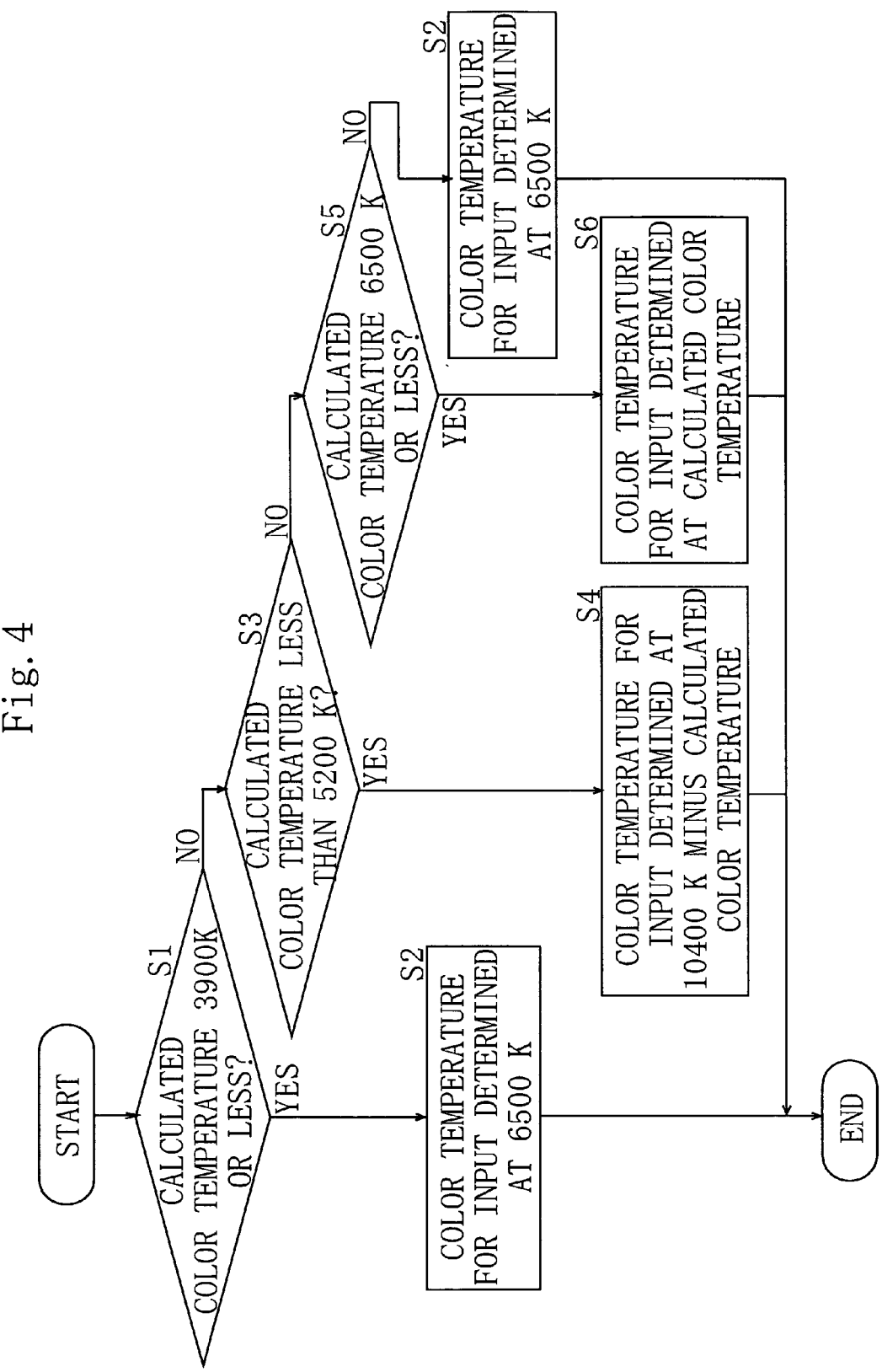
FIG. 4 is a flowchart of a part of the operation of the gain determination part 15c-3.

FIG. 4 shows an illustrative flowchart of the operation of the gain determination part 15c-3 for allowing the "calculated color temperature versus color temperature for input" curve to have a V-shape as shown in FIG. 3.

Firstly, it is determined to which of the four ranges the calculated color temperature belongs (Steps S1, S3 and S5). The four ranges are: a range of zero up to 3900 K, a range between 3900 K and 5200 K, a range between 5200 K and 6500 K, and a range above 6500 K.

When the calculated color temperature is in the range of zero up to 3900 K or in the range above 6500 K (Step S1, YES; or Step S1, NO, then Step S3, NO, and then Step S5, NO), the color temperature for input is determined to 6500 K (Step S2). When the calculated color temperature is in the range between 5200 K and 6500 K (Step S1, NO, then Step S3, NO, and then Step S5, YES), the calculated color temperature is used as the color temperature for input (Step S6). When the calculated color temperature is in the range between 3900 K and 5200 K (Step S1, NO, and then Step S3, YES), the color temperature for input is determined to 10400 K minus the calculated color temperature (Step S4).

It should be noted that in the V-shaped curve as shown in FIG. 3, the interval between the threshold value 3900 and 5200 is equal to that between the threshold value 5200 and 6500 so that the left inclined portion of the V-shape (the processing in Step S4 of FIG. 4) can be established by a simple arithmetic operation. Incidentally, the value "10400" is an addition of the threshold values 6500 and 3900.

With regard to the gain determination part 15c-3 of the present embodiment, since the color temperature for input during stroboscope imagings ranges only between 3900 K and 6500 K, only white balance gains (Kr, Kb) of values corresponding to the range between 5200 K and 6500 K (the area surrounded by dotted lines in a lower-right table of FIG. 2) may be prepared for the look-up table for stroboscope imagings.

[Supplemental Description on First Embodiment]

In the present embodiment, the color temperature of the illumination equivalent to the sunset light is 3900 K, which may be another value between 3000 K and 4000 K. Moreover, since the color temperature of the sunset light varies with where the electronic camera is used, it is preferably set to an optimum value depending on the area.

In the present embodiment, the color temperature of the illumination equivalent to the daytime light is 5200 K, which may be another value between 5000 K and 5500K. Moreover, since the color temperature of the daytime light varies with where the electronic camera is used, it is preferably set to an optimum value depending on the area.

In the present embodiment, the color temperature of the illumination equivalent to the strobe light is 6500 K, which may be another value between 6000 K and 7000 K. Since the color temperature of the strobe light depends on the type and settings of the stroboscope device 13, it is preferably set to an optimum value in compliance with the type and settings of the stroboscope device 13.

In the present embodiment, the data of the look-up table for stroboscope imagings (i.e., white balance gains (Kr, Kb)) are preferably determined in accordance with the type and settings of the stroboscope device 13.

In the present embodiment, the look-up table for stroboscope imagings stores therein such white balance gains that suppress the color of the illumination of the strobe light for each color temperature (See FIG. 2), and the inventive method for referring to the look-up table (the "calculated color temperature versus color temperature for input" curve) is employed (See FIG. 3). However, the same effects can be attained from the following.

That is, a look-up table in which calculated color temperatures are associated in advance with white balance gains to be set is used to employ the calculated color temperatures as the color temperatures for input.

Figure 5:
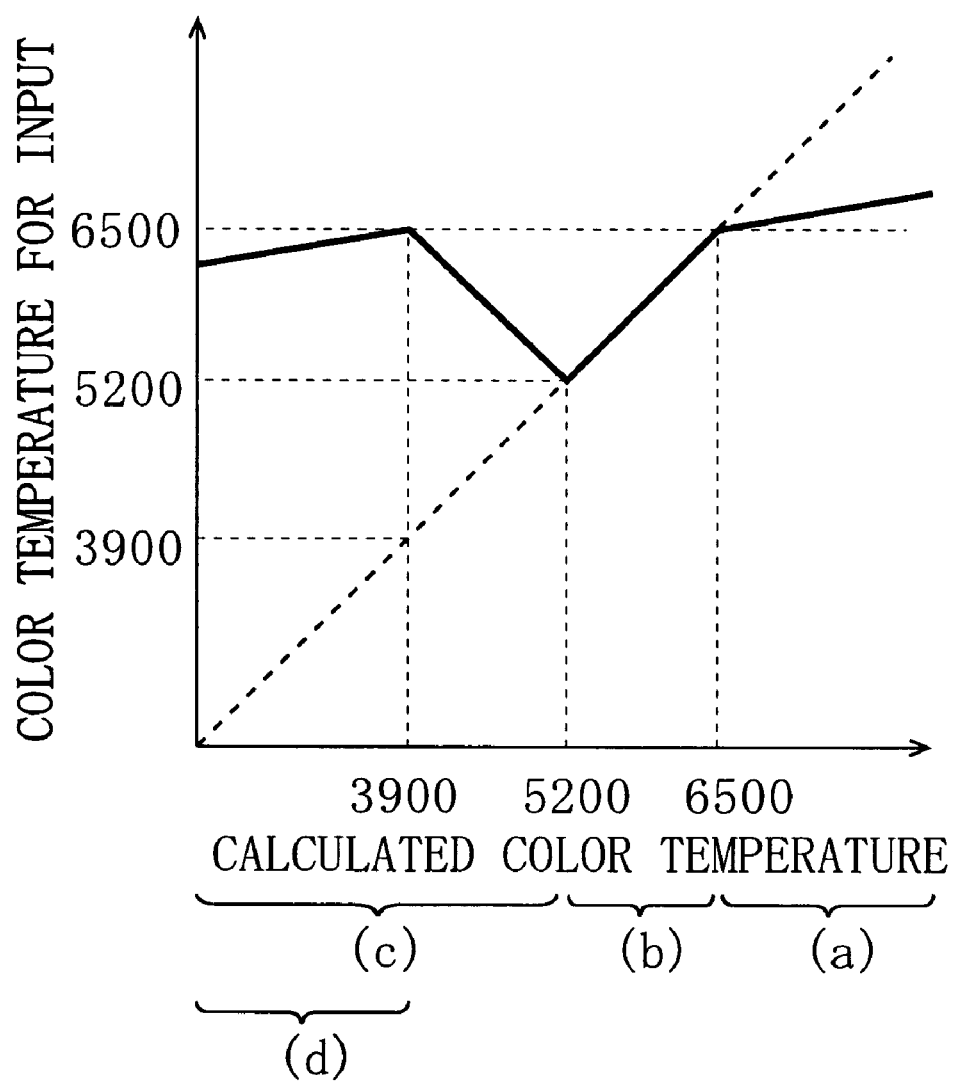
FIG. 5 is a diagram showing another example of a method for referring to the look-up table for stroboscope imagings (a "calculated color temperature versus color temperature for input" curve) implemented by the gain determination part 15c-3.

The inventive method for the gain determination part 15c-3 of the present embodiment to refer to the look-up table for stroboscope imagings (the "calculated color temperature versus color temperature for input" curve) is not limited to what is shown in FIG. 4 but may be modified as shown in FIG. 5. The curve as shown in FIG. 5 have slightly inclined portions which have right-hand increases and left-hand decreases in the ranges (a) and (d), respectively.

Second Embodiment

A second embodiment of the present invention will now be described with reference to FIGS. 1, 6 and 7. The present embodiment is a modification of the first embodiment. Only the differences in the present embodiment than the first embodiment will be described below.

As shown in FIG. 1, an electronic camera 11' of the present embodiment has a condensing lens 11g and a colorimeter 11h. The output of the colorimeter 11h indicates the type of field light (whether the field light is a fluorescent light or not). The electronic camera 11' of the present embodiment also has a circuit section 15' in place of the circuit section 15.

Figure 6:
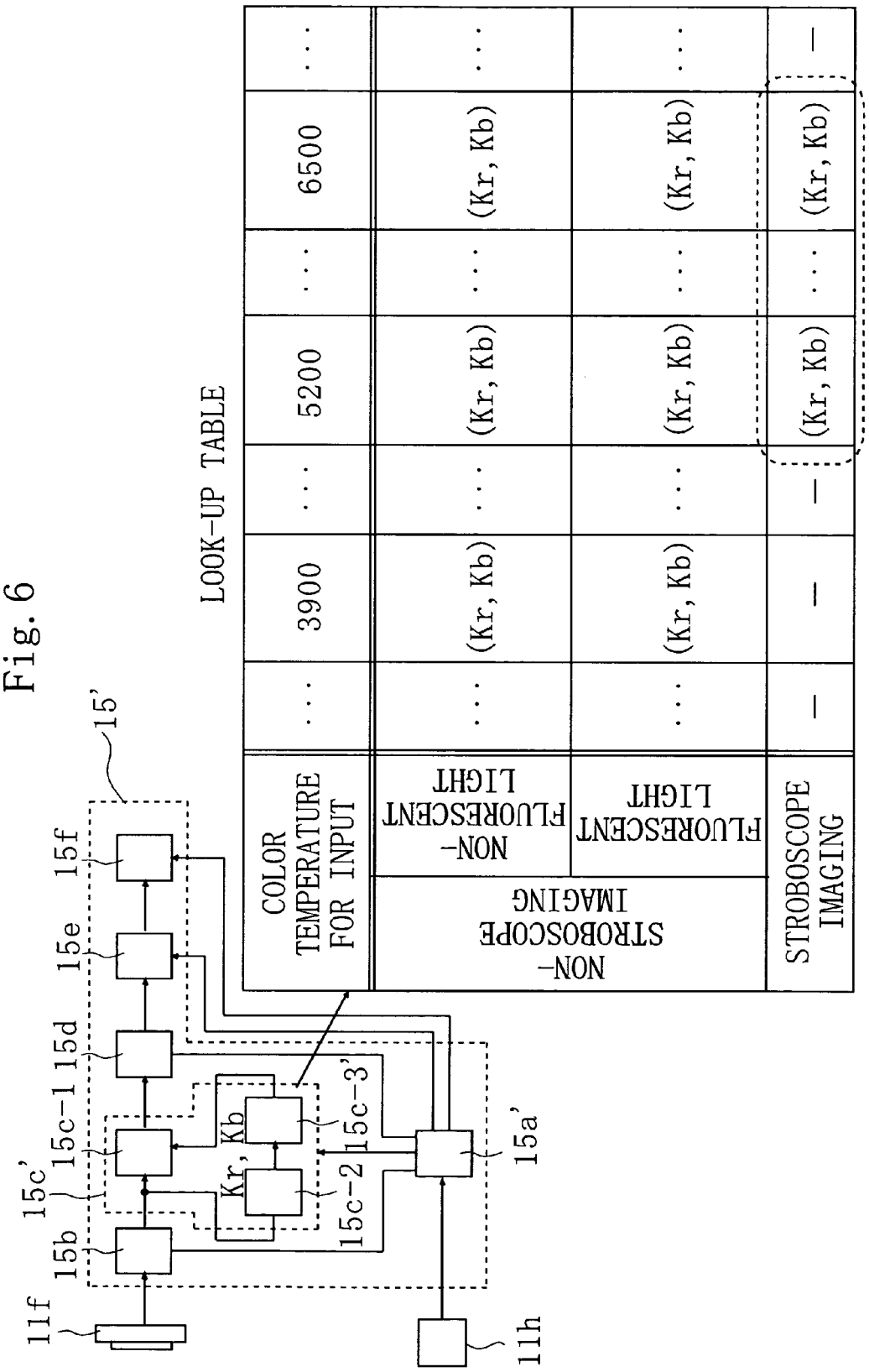
FIG. 6 is a block diagram of a circuit section 15'.

As shown in FIG. 6, the circuit section 15' of the present embodiment is the same as the circuit section 15 of the first embodiment except that a CPU 15a' replaces the CPU 15a of the first embodiment and that a white balance correction circuit 15c' replaces the white balance correction circuit 15c of the first embodiment. The white balance correction circuit 15c' is the same as the white balance correction circuit 15c of the first embodiment except that a gain determination part 15c-3' replaces the gain determination part 15c-3 of the first embodiment. The CPU 15a' of the present embodiment identifies from an output of the calorimeter 11h the type of field light (whether the field light is a fluorescent light or not) just before a stroboscope imaging. Then, the CPU 15a' instructs the gain determination part 15c-3' to perform a processing in accordance with the identification result.

FIG. 7 shows methods for the gain determination part 15c-3' to refer to the look-up table for stroboscope imagings (the "calculated color temperature versus color temperature for input" curve).

For non-fluorescent light, a referring method as shown in FIG. 7(I), which is the same as the referring method of the first embodiment, is employed. (See the first embodiment for details.) For fluorescent light, a referring method as shown in FIG. 7(II) is employed. A specific description thereof will be made below.

When the calculated color temperature is equal to or higher than the color temperature of the illumination equivalent to the daytime light (5200 K) (FIG. 7(II) (a) and (b)), the "calculated color temperature versus color temperature for input" curve is set to the same as that of the first embodiment. When the calculated color temperature is lower than the color temperature of the illumination equivalent to the daytime light (5200 K) (FIG. 7(II) (c)), the color temperature for input is set to a value closer to the color temperature of the illumination equivalent to the daytime light (5200 K). For example, the color temperature for input is set to a value coinciding with the color temperature of the illumination equivalent to the daytime light (5200 K) regardless of the value of the calculated color temperature. That is, the "calculated color temperature versus color temperature for input" curve is established such that "the color temperature for input is equal to 5200 K".

This is because a stroboscopic image captured with illumination of fluorescent light and whose calculated color temperature is in the range (c) in FIG. 7(II) is probably given relatively great influence from the fluorescent light. Additionally, general users are apt to avoid shooting with the fluorescent light, which is not natural light such as sunset light but artificial light. Therefore, it is highly possible that users want to eliminate, as much as possible, the influence of the fluorescent light on the stroboscopic image.

However, if the color temperature for input of this range (FIG. 7(II) (c)) coincides with the color temperature of the single illumination of the strobe light (6500 K), the curve (i.e., the "calculated color temperature versus color temperature for input" curve) will be discontinuous between the range (c) and the adjacent range (FIG. 7(II) (b)). Therefore, the color temperatures for input should be set to a value coinciding not with the color temperature of the single illumination of the strobe light (6500 K) but with that of the illumination equivalent to the daytime light (5200 K). In this case, the "calculated color temperature versus color temperature for input" curve exhibits a "reverse Z-shape" as a whole.

Figure 8:
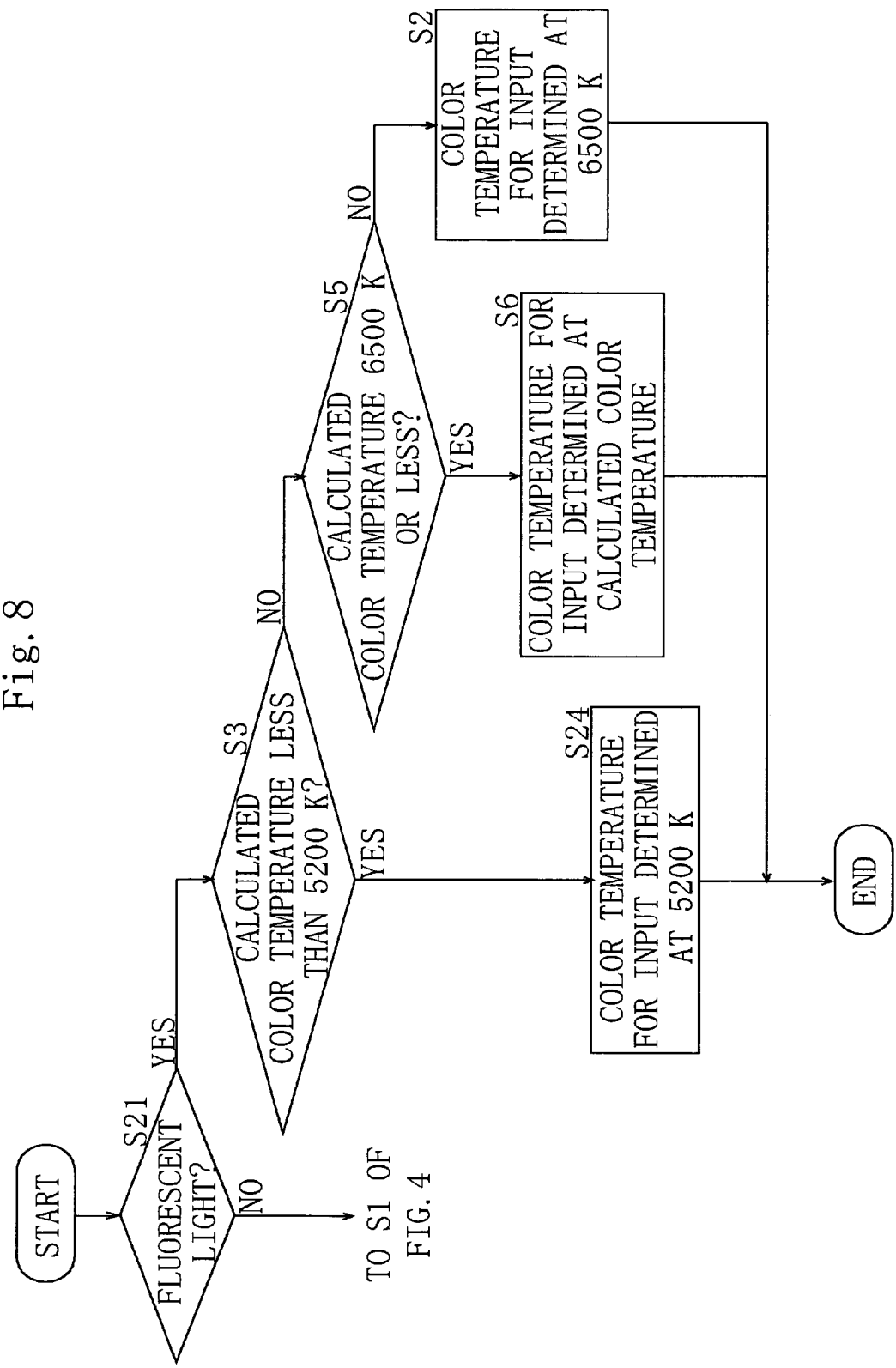
FIG. 8 is a flowchart of a part of the operation of the gain determination part 15c-3'.

FIG. 8 shows an illustrative flowchart of the operation of the gain determination part 15c-3' for obtaining the "reverse Z-shaped curve" of FIG. 7(II) as the "calculated color temperature versus color temperature for input" curve. FIG. 8 begins with Step S21 where it is identified whether the field light is a fluorescent light. If the field light is a non-fluorescent light (Step S21, NO), the operation of the first embodiment shown in FIG. 4 is executed.

If the field light is a fluorescent light, firstly it is identified to which of the three regions the calculated color temperature belongs (Steps S3 and S5). The three ranges are: the range below 5200 K, the range between 5200 K and 6500 K, and the range above 6500 K. With the calculated color temperature being in the range above 6500 K (Step S3, NO, and then Step S5, NO), the color temperature for input is determined at 6500 K (Step 52). When the calculated color temperature is in the range between 5200 K and 6500 K (Step S3, NO, and then Step S5, YES), the calculated color temperature is used as the color temperature for input (Step S6). When the calculated color temperature is in the range below 5200 K (Step S3, YES), it is determined that the color temperature for input is 5200 K (Step S24).

In addition to the first embodiment, the present embodiment as described above, identifies, from the output of the colorimeter 11h, the type of the field light (whether the field light is a fluorescent light or not), and changes, in accordance with the identified type, the relationship between the range of the calculated color temperature and the degree of the reflection of the calculated color temperature in the white balance gains (Kr, Kb). Irrespective of fluorescent light or not, the present embodiment can deal with various types of stroboscopic images by the simple processing of positively decreasing the degree of the reflection of the calculated color temperature in the white balance gains (Kr, Kb) when the calculated color temperature is in a predetermined range. Thus, according to the present embodiment, the white balance gains (Kr, Kb) during stroboscope imagings can be appropriately set by use of the relatively simple processing.

[Supplemental Description on Second Embodiment]

The second embodiment employs as a colorimeter the colorimeter 11h for receiving light having passed through the lens 12. In place of such colorimeter, a filed light sensor may be provided on, for example, a front portion of the electronic camera body 11, receiving an incident light from the direction of the subject field without passing through the lens 12.

Alternatively, the electronic camera body 11 may perform a non-stroboscope imaging just before a stroboscope imaging and identify the type of filed light from an image obtained thereby.

In the present embodiment, the look-up table for stroboscope imagings stores therein such white balance gains that suppress the color of the illumination of the strobe light for each color temperature (See FIG. 6), and the inventive method for referring to the look-up table (the "calculated color temperature versus color temperature for input" curve) is employed (See FIG. 7(I) and (II)). However, the same effects can be attained in the following way.

That is, a look-up table stores therein in advance every calculated color temperature and its corresponding white balance gains to be set in associated with each other, and the calculated color temperatures are used as the color temperatures for input. However, in the present embodiment, the white balance gains to be set are different depending on whether or not the field light during a stroboscope imaging is a fluorescent light. Accordingly, two sorts of look-up table for stroboscope imagings need be created: a look-up table for the fluorescent light (at least for the calculated color temperature below 5200 K) and a look-up table for the non-fluorescent light.

[Additional description]

In the embodiments described above, the white balance correction circuits (15c, 15c') decreases the degree of the reflection of the calculated color temperature in the white balance correction values (white balance gains) when the calculated color temperature is in the range (a) of FIG. 3 (FIG. 7) as well as in the range (c) of FIG. 3 (FIG. 7). However, the electronic camera body 11 may be adapted to decrease the degree only when the calculated color temperature is in the range (a) or in the range (c).

Also in the embodiments described above, the look-up tables are used for setting the white balance correction values (white balance gains). Needless to say, however, other methods may be used for the setting.

The invention is not limited to the above embodiments and various modifications may be made without departing from the spirit and scope of the invention. Any improvement may be made in part or all of the components.

What is claimed is:

1. An electronic camera having one of a light emitting unit and a connection terminal to a light emitting unit, said electronic camera comprising:

an imaging unit for capturing an image of a subject;

a calculating unit for calculating a color temperature of double illumination according to the image captured with the double illumination which is illumination of both field light and emitted light emitted by said light emitting unit; and a setting unit for allowing the calculated color temperature to be utilized in a white balance correction value to be applied to said image, wherein when said calculated color temperature is in a predetermined range, said setting unit uses a predetermined color temperature which is utilized in the white balance correction value that is different than the calculated color temperature.

2. The electronic camera according to claim 1, wherein when said calculated color temperature is higher than a color temperature of single illumination of said emitted light, said setting unit allows said white balance correction value to approximate a value that suppresses a color of the single illumination.

3. The electronic camera according to claim 2, wherein when said calculated color temperature is higher than the color temperature of the single illumination of said emitted light, said setting unit allows said white balance correction value to coincide with the value that suppresses the color of the single illumination.

4. The electronic camera according to claim 2, wherein when said calculated color temperature is lower than a color temperature of illumination equivalent to daytime light, said setting unit allows said white balance correction value to approximate the value that suppresses the color of the single illumination of said emitted light.

5. The electronic camera according to claim 4, wherein when said calculated color temperature is lower than the color temperature of the illumination equivalent to daytime light and also lower than a color temperature of illumination equivalent to sunset light, said setting unit allows said white balance correction value to further approximate to said value.

6. The electronic camera according to claim 5, wherein when said calculated color temperature is lower than the color temperature of the illumination equivalent to daytime light and also lower than the color temperature of the illumination equivalent to sunset light, said setting unit allows said white balance correction value to coincide with said value.

7. The electronic camera according to claim 2, wherein when said calculated color temperature is lower than a color temperature of illumination equivalent to daytime light, said setting unit allows said white balance correction value to approximate a value that suppresses a color of the illumination equivalent to daytime light.

8. The electronic camera according to claim 1, further comprising a unit for identifying a type of said field light, wherein said setting unit changes, depending on the identified type, a relationship between a range of said calculated color temperature and the use of the predetermined color temperature which is utilized in the white balance correction value.

9. A white balance correction circuit for use with an electronic camera capable of emitting emitted light, said circuit comprising:

a calculating unit for calculating a color temperature of double illumination according to an image captured by said electronic camera with the double illumination which is illumination of both field light and emitted light; and a setting unit for allowing the calculated color temperature to be utilized in a white balance correction value to be applied to said image, wherein when said calculated color temperature is in a predetermined range, said setting unit uses a predetermined color temperature which is utilized in the white balance correction value that is different than the calculated color temperature.

10. The white balance correction circuit according to claim 9, wherein when said calculated color temperature is higher than a color temperature of single illumination of said emitted light, said setting unit allows said white balance correction value to approximate a value that suppresses a color of the single illumination.

11. The white balance correction circuit according to claim 10, wherein when said calculated color temperature is higher than a color temperature of single illumination of said emitted light, said setting unit allows said white balance correction value to approximate the value that suppresses the color of the single illumination of said emitted light.

12. The white balance correction circuit according to claim 10, wherein when said calculated color temperature is lower than a color temperature of illumination equivalent to daytime light, said setting unit allows said white balance correction value to approximate the value that suppresses the color of the single illumination of said emitted light.

13. The white balance correction circuit according to claim 12, wherein when said calculated color temperature is lower than the color temperature of the illumination equivalent to daytime light and also lower than a color temperature of illumination equivalent to sunset light, said setting unit allows said white balance correction value to further approximate to said value.

14. The white balance correction circuit according to claim 13, wherein when said calculated color temperature is lower than the color temperature of the illumination equivalent to daytime light and also lower than the color temperature of the illumination equivalent to sunset light, said setting unit allows said white balance correction value to coincide with said value.

15. The white balance correction circuit according to claim 10, wherein when said calculated color temperature is lower than the color temperature of the illumination equivalent to daytime light, said setting unit allows said white balance correction value to approximate a value that suppresses the color of the illumination equivalent to daytime light.

16. The white balance correction circuit according to claim 9, wherein:
said electronic camera is capable of identifying a type of said field light; and
said setting unit changes, depending on the identified type, a relationship between a range of said calculated color temperature and the use of the predetermined color temperature which is utilized in the white balance correction value.

* * * * *